US008768960B2

(12) United States Patent
Hu et al.

(10) Patent No.: US 8,768,960 B2
(45) Date of Patent: Jul. 1, 2014

(54) ENHANCING KEYWORD ADVERTISING USING ONLINE ENCYCLOPEDIA SEMANTICS

(75) Inventors: Jian Hu, Beijing (CN); Jian-Tao Sun, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1023 days.

(21) Appl. No.: 12/356,272

(22) Filed: Jan. 20, 2009

(65) Prior Publication Data

US 2010/0185689 A1 Jul. 22, 2010

(51) Int. Cl.
*G06F 17/30* (2006.01)

(52) U.S. Cl.
USPC ............ 707/776; 707/736; 707/738; 707/755

(58) Field of Classification Search
USPC ......... 715/200, 201, 202, 203, 204, 234, 235, 715/236, 254
See application file for complete search history.

(56) References Cited

U.S. PATENT DOCUMENTS

| | | | |
|---|---|---|---|
| 5,619,410 A | 4/1997 | Emori et al. | |
| 6,112,202 A * | 8/2000 | Kleinberg | 1/1 |
| 6,243,670 B1 | 6/2001 | Bessho et al. | |
| 6,687,696 B2 * | 2/2004 | Hofmann et al. | 1/1 |
| 7,284,196 B2 * | 10/2007 | Skeen et al. | 715/234 |
| 8,209,333 B2 * | 6/2012 | Hubbard et al. | 707/736 |
| 8,554,571 B1 * | 10/2013 | Harrison, Jr. | 705/1.1 |
| 8,583,448 B1 * | 11/2013 | Harrison, Jr. | 705/1.1 |
| 2003/0046318 A1 * | 3/2003 | Schohn et al. | 707/513 |
| 2003/0088543 A1 * | 5/2003 | Skeen et al. | 707/1 |
| 2004/0049503 A1 * | 3/2004 | Modha et al. | 707/3 |
| 2005/0278325 A1 | 12/2005 | Mihalcea et al. | |
| 2007/0011150 A1 * | 1/2007 | Frank | 707/4 |
| 2007/0078889 A1 * | 4/2007 | Hoskinson | 707/102 |
| 2007/0179944 A1 * | 8/2007 | Van Dyke Parunak et al. | 707/5 |
| 2007/0198246 A1 * | 8/2007 | Goradia | 704/4 |
| 2007/0288514 A1 | 12/2007 | Reitter et al. | |
| 2008/0005284 A1 * | 1/2008 | Ungar et al. | 709/219 |
| 2008/0010249 A1 * | 1/2008 | Curtis et al. | 707/3 |
| 2008/0010609 A1 * | 1/2008 | Curtis et al. | 715/810 |
| 2012/0290407 A1 * | 11/2012 | Hubbard et al. | 705/14.72 |

OTHER PUBLICATIONS

Wandora Index, Wandora Wiki, Jun. 17, 2007.*
Wandora Features, Wandora Wiki, Nov. 15, 2007.*
Wandora Change Log, Wandora Wiki, Jul. 31, 2007.*
Wandora Documentation, Wandora Wiki, Jun. 15, 2007.*
Wandora WordNet, Wandora Wiki, Nov. 10, 2007.*
Wandora MediaWiki, Wandora Wiki, Aug. 30, 2007.*
Kleinberg, Jon (1999). "Authoritative sources in a hyperlinked environment" (PDF). Journal of the ACM 46 (5): 604-632. doi:10.1145/324133.324140.*
ISO/IEC 13250: Topic Maps; Dec. 3, 1999.*

(Continued)

*Primary Examiner* — Debbie Le
(74) *Attorney, Agent, or Firm* — Carole Boelitz; Micky Minhas; Lee & Haynes, PLLC (57) ABSTRACT

Disclosed are systems and methods for extracting semantic-based keywords through mining word semantics using an online encyclopedia's taxonomy. Described is the use a semantic bipartite graph that relates candidate keywords and topics.

20 Claims, 4 Drawing Sheets

(56) References Cited

OTHER PUBLICATIONS

Paukkeri et al., "A Language-Independent Approach to Keyphrase Extraction and Evaluation" retrived on Nov. 21, 2008 at <<http://www.aclweb.org/anthology-new/C/C08/C08-2021.pdf>>, Coling 2008: Companion volume—Posters and Demonstations, pp. #83-pp. #86.

Giarlo, "A Comparative Analysis of Keyword Extraction Techniques" retrived on Nov. 21, 2008 at <<http://lackoftalent.org/michael/papers/596.pdf>>, Rutgers.

Wu, et al., "Keyword Extraction for Contextual Advertisement" retrived on Nov. 21, 2008 at <<http://www2008.org/papers/pdf/p1195-wu.pdf>>, WWW2008, pp. #1195-pp. #1196.

Hunyadi, "Keyword Extraction: Aims and Ways Today and Tomorrow" retrived on Nov. 21, 2008 at <<http://www.keyword.kcl.ac.uk/redist/pdf/hunyadi.pdf>>, Lajos Kossuth University.

Meyer, et al, "Towards using Wikipedia as a Substitute Corpus for Topic Detection and Metadata Generation in E-Learning ", retrived on Nov. 21, 2008 at <<http://www.lornet.org/Portals/10/I2LOR06/1_Towards%20Using%20Wikipedia%20as%20%20substitute%20Corpus%20for%20Topics%20Detection%20&%20Metadata%20Generation%20in%20E-Learning.pdf>>.

Ercan, et al. "Using Lexical Chains for Keyword Extraction " retrived on Nov. 21, 2008 at <<http://www.cs.bilkent.edu.tr/~ilyas/PDF/ipm2007.pdf>>, Department of Computer Engineering Bilkent University.

Mihalcea, et al "Wikify! Linking Documents to Encyclopedic Knowledge" retrived on Nov. 21, 2008 at <<http://delivery.acm.org/10.1145/1330000/1321475/p233-mihalcea.pdf? key1=1321475&key2=5147427221&coll=GUIDE&dl=GUIDE&CFID=11976825&CFTOKEN=33811347>>, pp. #233-pp. #241.

\* cited by examiner

ENHANCING KEYWORD ADVERTISING USING ONLINE ENCYCLOPEDIA SEMANTICS

BACKGROUND

Contextual advertising aims at delivering the most relevant advertisements (ads) based on the extracted keywords from a web page. It is one of the most successful business models to monetize the traffic from the publisher. However, traditional keyword extraction methods mainly rely on frequency of "words" and occurrence position of words, rather than content. This may result in irrelevant ad suggestions.

Keyword advertising services, such as content-targeted advertising have grown to become a primary revenue source for many web service providers, and a significant part of the search engine market. A typical content-based advertising service extracts a few representative keywords from a given web page, and then uses these keywords to search relevant advertisements against a huge repository of ads. The selected ads are then displayed together with the web page, and made visible to the user. If a user clicks on the link of an ad, the advertiser is charged a fee that is shared by both the web page owner and the advertising service provider. Accurate keyword extraction from the web page is critical to ensure the delivery of relevant ads to the right users, therefore enabling collection of higher income for both the web page owner and the advertising service. It has been shown that there exist a strong correlation between the accuracy of keyword extraction and the click-through-rate of delivered ads.

Current keyword extraction algorithms may be based on either heuristic rules, or supervised learning. These methods may only use term frequency and document structural information, and may not leverage words' semantics. These methods may result in inconsistent outputs, and degrade a system's accuracy.

SUMMARY

This document describes tools for to extract semantic-based keywords through mining word semantics using an online encyclopedia's taxonomy. The proposed approach is performed in a fully unsupervised manner. In order to further identify words not covered by an online encyclopedia, traditional methods may be used with the described tools into a supervised machine learning framework.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

The Wikipedia® encyclopedia may be the largest online encyclopedia, containing more than two million entries. Each entry may be either a representative named entity or an important keyword, and can be considered as a semantic concept. In this document entry and concept (i.e., online encyclopedia concept) are interchangeable. An online encyclopedia concept may be summarized by an article and belong to at least one category. Categories of an online encyclopedia may be organized hierarchically into an ontology.

Online encyclopedia concepts may cover a majority of frequent queries submitted to a commercial search engine; and since most advertisers prefer to buy popular user-searched queries, an online encyclopedia is a good resource for keyword advertising.

Therefore, an online encyclopedia may be implemented as an external knowledge source to facilitate keyword extraction. This approach is based on the following concepts: the representative keywords may be the words that are most relevant to the topics of a web page, and that an online encyclopedia may be regarded as taxonomy of domain keywords with enough coverage. Therefore, a semantic bipartite graph between candidate keywords and topics is built based on the hierarchical relation from an online encyclopedia taxonomy. Through the analysis of the constructed semantic graph, the main topics of a document may be determined, while simultaneously selecting representative keywords as an output. Although this approach operates in a fully unsupervised manner, where no labeled training data may required, it may be expected to outperform the existing supervised keyword extraction algorithm by in accuracy. In addition, output of from such an unsupervised algorithm may be used as features in a supervised machine learning framework.

Keyword extraction may be regarded as a critical step for automatic text summarization. Keyword extraction from web documents has become an active research field due to its application in online advertising. For example, GenEx is a system for keyword extraction based on a set of parameterized heuristic rules that are optimized to fit training data using a genetic programming algorithm. The KEA (key exchange) algorithm is another supervised machine learning algorithm for keyword extraction based on lexical features including Term Frequency-Inverse Document Frequency or TFIDF algorithm, and word occurrence positions. Clustering algorithms may be used for partitioning sentences of a document into a small number of topic groups to generate saliency scores for keywords and sentences. Therefore, sentence and keyword weighting models may be designed within each topic group. In certain models, each document may be used as a semantic network, which is then used to identify keywords. The KEA algorithm is commonly used, due to acceptable accuracy and simple implementation.

Keyword candidates may also be used to query the search engine and then use the number of hit documents as an additional feature for keyword extraction. Furthermore, the use of the link information of a web page may be implemented, where a "semantic ratio feature" is designed as the frequency of the candidate keyword p in the original document "D", divided by the frequency of "p" in documents linked by "D".

However, the "semantic ratio feature" may rely highly on the quality of in-link anchor text, which may not be the case in practice. Many web pages do not have many in-links, and therefore no high quality anchor text. Furthermore, downloading and parsing web pages can introduce a substantial computational overhead.

Another supervised approach may implement that use of a number of features, such as TF (term frequency) and IDF (inverse document frequency) of each potential keyword and term frequency in query logs, to learn how to extract keywords from web pages for advertisement targeting. Furthermore, logistic regression may be performed to learn a model from human labeled data, combined with document-, text-, and eBay®-specific features. These methods may depend heavily on human-labeled training data, and furthermore may not consider the semantic relations between keywords.

Another method may provide the ability to match advertisements to web pages based on a topical match as a major component of the relevance score. The topical match relies on the classification of pages and ads into a commercial advertising taxonomy to determine their topical distance. Although the topical match may be considered as one factor when extracting keywords, the construction of the taxonomy classifier may be laborious and the classifier may not be very accurate, especially for a relatively large taxonomy.

An online encyclopedia may be used for lexicon acquisition, information extraction, taxonomy building, and text categorization. For example, an online encyclopedia may be used to extract semantic related lexicons by utilizing an online encyclopedia taxonomy path and the text similarity between the associated articles, and may be confirmed by the WordNet semantic lexicon for the English language.

An online encyclopedia may also be used to extract lexical relationships to extend the WordNet semantic lexicon. Online encyclopedia articles and rich link structures may also be used to disambiguate named entities of different documents. This may be an important task of information extraction, since different entities often share the same name in reality. Methods may be implemented to derive a large scale taxonomy from an online encyclopedia. Furthermore, improved web page classification accuracy may be made, by exploiting the categories associated with the keywords by an online encyclopedia. Concept relations may be extracted from an online encyclopedia and utilize the extracted relations to improve text classification and clustering and their reported results confirmed that the relations in the online encyclopedia can enhance the text classification and clustering performance.

Keyword Extraction Using an Online Encyclopedia

Figure 1:
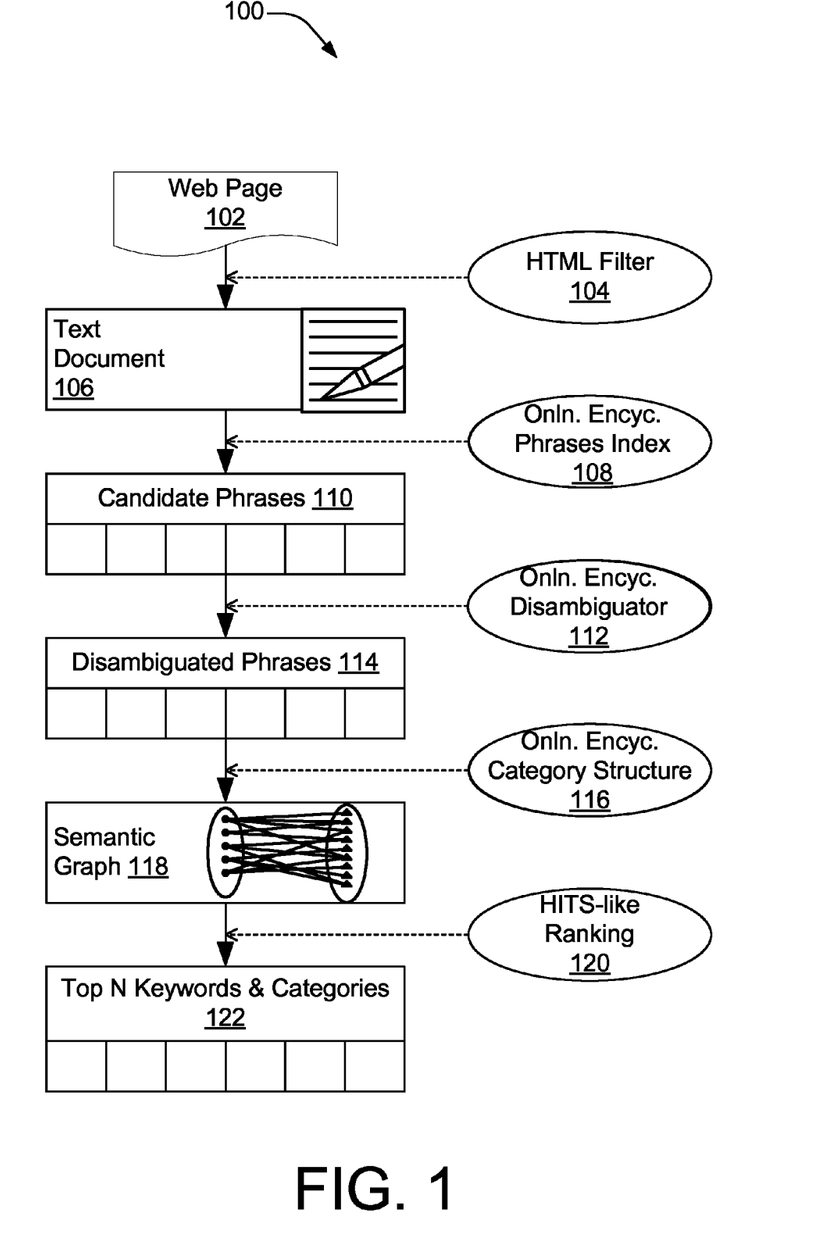
FIG. 1 is a flowchart of an algorithm that cleans noise from a web page and generates candidate phrases based on online encyclopedia concepts.

FIG. 1 shows a flowchart 100 that describes a method using an online encyclopedia for automatic keyword extraction. The method may be implemented in one or more computing tools or devices as described below.

The method first cleans the noise of a web page 102 by a HTML filter or parser 104 and creating a text document/DOM tree 106. An Online Encyclopedia Phrases Index 108 may be applied to the text document/DOM tree 106, and then candidate phrases 110 are generated based on online encyclopedia concepts of the Online Encyclopedia Phrases Index 108. An Online Encyclopedia Disambiguator 112 may be applied to create Disambiguated Phrases 114. An Online Encyclopedia Category Structure 116 may be applied to construct a Semantic Graph 118 for keywords based on the relations between online encyclopedia concepts and categories. Hyperlink-Induced Topic Search (HITS) or HITS-like Ranking may be applied based on semantic analysis of the Semantic Graph 118, to extract top-ranked keywords and categories 122.

In certain embodiments, the filter or parser 104, and Disambiguator 112 may be implemented as a hardware, or a module in memory of computing device, such as discussed below. Furthermore, the Category Structure 116 may be stored in memory.

Since HTML is a visual representation language instead of a structuralized language, some additional analysis may be performed. The HTML filter 104 or parser may be applied to convert the web page 102 into a DOM tree (text document 106). Then, from the DOM tree (i.e., text documents 106), some useful information, including the page title, meta keywords, meta descriptions, hyperlinks and page content, are extracted. Given the textual content from the previous step, a simple text preprocessing module (i.e., step) may be applied to tokenize the full-text feature into a bag of words. Then, all candidate phrases 110 in the web page may be mapped into online encyclopedia concepts by the disambiguation process (i.e., Online Encyclopedia Disambiguator 112).

Candidate topics of the Web page 102 may be determined by collecting the top three level hyper-categories of all the online encyclopedia concepts in the document, and constructing semantic graph between candidate keywords and topics based on the hierarchical relation from the online encyclopedia taxonomy.

To facilitate the mapping of document phrases to online encyclopedia concepts, an index of online encyclopedia phrases may be built. The index may be included in memory. There are four sources to collect online encyclopedia phrases: the titles of articles, the titles of redirect pages, the disambiguation pages and the anchor text of online encyclopedia articles. Given a phrase, the index system determines whether it is an online encyclopedia phrase or a possible mapping concept. With the generated online encyclopedia phrases index, a Forward Maximum Matching algorithm and a dictionary-based word segmentation approach may be used, to search candidate phrases and map them to online encyclopedia phrases.

For example, consider the following paragraph: "Jaguar Cars Limited is an English-based luxury carmaker owned by the Ford Motor Company with headquarters at Browns Lane, Coventry. England. There is an engineering division in Whitley, Coventry."

The detected phrases are: "Jaguar Cars Limited" "luxury", "carmaker", "Ford Motor Company", "headquarters", "Browns Lane", "Coventry", "England" and "Whitley". Notice that "Jaguar Cars" is also an online encyclopedia phrase, but the length is shorter than "Jaguar Cars Limited" in the first sentence. Therefore, only keep "Jaguar Cars Limited" is kept.

Although an online encyclopedia such as the Wikipedia® encyclopedia may contain over two million noun phrases, it cannot cover all possible keywords of the tremendous web pages in the Internet. But for keyword advertising, advertisers prefer to buy popular user-searched queries since a query reflects a user's interests and needs in the Web. Through comparable analysis of half-year query logs and online encyclopedia concept phrases, online encyclopedia concepts can be found that cover most popular queries.

Once the candidate phrases in the web page 102 are identified, each phrase may be assigned to only one online encyclopedia concept, and a disambiguation process (Online Encyclopedia Disambiguator 112) may be applied, if the phrase is ambiguous.

Two measures may be used for word sense disambiguation: text similarity between the article content of candidate concepts and the content of the web page, and category agreement between the candidate concepts.

For example, let D be the content of the web page and $P_D=\{p_1,\ldots,p_m\}$ be the set of detected candidate phrases in D. It is denoted that $\epsilon(p)$ is the set of online encyclopedia concepts from the disambiguation page associated to a phrase p. For example, there are 23 entries in the disambiguation page for "apple" including "apple bank", "apple corps", "apple inc.", "apple (fruit)", and etc. The set $\epsilon(p=apple)$ includes all these entries. An objective may be to choose one assignment of a concept in $\epsilon(p)$ for phrase p that maximizes the text similarity and category agreement.

α: Text Similarity

Cosine similarity of TFIDF may be used to measure the similarity between an online encyclopedia concept article and web page content. For each phrase p in the web page D, a determination may be made as to the text similarity $\alpha_{c_k}$ between D and the online encyclopedia concept $c_k$, $c_k \in \epsilon(p)$.

For example, let $\delta_D$ be the TFIDF vector of D and $\delta_{c_k}$ be the TFIDF vector of the online encyclopedia article corresponding to $c_k$. Therefore, similarity may be calculated by the following equation:

$$\alpha_{c_k} = \cos\_sim(\delta_D, \delta_{c_k}) \quad (1)$$

Where cos_sim(.,.) is defined as the cosine similarity between two vectors.

β: Category Agreement

Category agreement among the category tags of candidate phrases is a helpful feature for disambiguation. Therefore, category agreement may be adapted as context for concept disambiguation.

Each phrase p is considered the category agreement β between the web page D and each online encyclopedia concept $c_k$, $c_k \in \epsilon(p)$. It is denoted that $T=(t_1, t_2, \ldots, t_N)$ as the set of all online encyclopedia categories and $T_{c_k}$ as the set of categories of the concept $c_k$. Let $\tau_{ck} \in \{0,1\}^N$ be the category vector of $c_k$, which is defined by the following equation:

$$\tau^i_{c_k} = \begin{cases} 1, & \text{if } t \in T_{c_k} \\ 0, & \text{otherwise} \end{cases} \quad (2)$$

Similarly, for each phrase p, the category vector τp can be obtained from the set of categories of all possible concepts associated with phrase p, leading to the following equation:

$$\tau^i_p = \begin{cases} 1, & \text{if } t_i \in \bigcup_{c_k \in \epsilon(p)} T_{c_k} \\ 0, & \text{otherwise} \end{cases} \quad (3)$$

Therefore, the category vector of the web page $\tau_D$ is defined by the following equation:

$$\tau_D = \sum_{p \in P_D} \tau_p \quad (4)$$

The category agreement for each $c_k$ may be defined by the following equation:

$$\beta_{c_k} = \langle \tau_D - \tau_{c_k}, \tau_{c_k} \rangle \quad (5)$$

Before merging these two factors, a normalize process is performed as defined by the following equations:

$$\overline{\alpha_{c_k}} = \frac{\alpha_{c_k}}{\sqrt{\sum_{c_j \in \epsilon(p)} \alpha^2_{c_j}}} \quad (6)$$

-continued $$\overline{\beta_{c_k}} = \frac{\beta_{c_k}}{\sqrt{\sum_{c_j \in \epsilon(p)} \beta^2_{c_j}}} \quad (7)$$

A goal may be to find the assignment of a concept to each phrases p that maximizes the text similarity as well as the category agreement. This can be expressed by the following equation:

$$\underset{c_k \in \epsilon(p)}{\mathrm{argmax}} \overline{\alpha_{c_k}} + \overline{\beta_{c_k}} \quad (8)$$

Semantic Graph Construction for Keywords

As described above, each candidate phrase is assigned to an online encyclopedia concept. Since each online encyclopedia concept belongs to at least one hyper-category, the candidate topics of web page 106 may be computed by collecting the hyper-categories of all online encyclopedia concepts in the web page 106. However, if only the first level hyper-categories are considered, deeper relations between concepts cannot be discovered. For example, the concept "shrimp" has a category tag "seafood", while the concept "banana" has a category tag "fruit". At this level, no common categories are discovered. But "seafood" and "fruit" have a common hyper-category "food", which is helpful to describe topics of the web page. Thus, we expand the Web page's candidate topics by collecting the top M levels of hyper-categories of online encyclopedia concepts.

For each phrase p, it is denoted that $c_p$ as the assigned concept to p. Let $R_t$ be the parent category set of category t. The M levels of hyper-categories of p are represented as $T_p^{(1)}$, $T_p^{(2)}, \ldots,$ and $T_p^{(M)}$ respectively by the following equations:

$$T_p^{(1)} = T_{c_p} \quad (9)$$

$$T_p^{(2)} = \bigcup_{t \in T_1} R_t - T_p^{(1)} \quad (10)$$

$$T_p^{(M)} = \bigcup_{t \in T_{M-1}} R_t - T_p^{(1)} - \ldots - T_p^{(M-1)} \quad (11)$$

The category set for a candidate phrase may be defined by the following equation:

$$T_p = T_p^{(1)} + T_p^{(2)} + \ldots + T_p^{(M)} \quad (12)$$

Therefore, a bipartite graph $G=(V_p+V_t, E)$ is built, where $V_{ph}=P_D$ is the vector of candidate phrases, $V_t=\bigcup_{p \in PD} T_p$ is the vector of candidate topics and $E=\{<p,t>|t \in T_p, p \bar{A} V_p, t \bar{A} V_t\}$.

Figure 2:
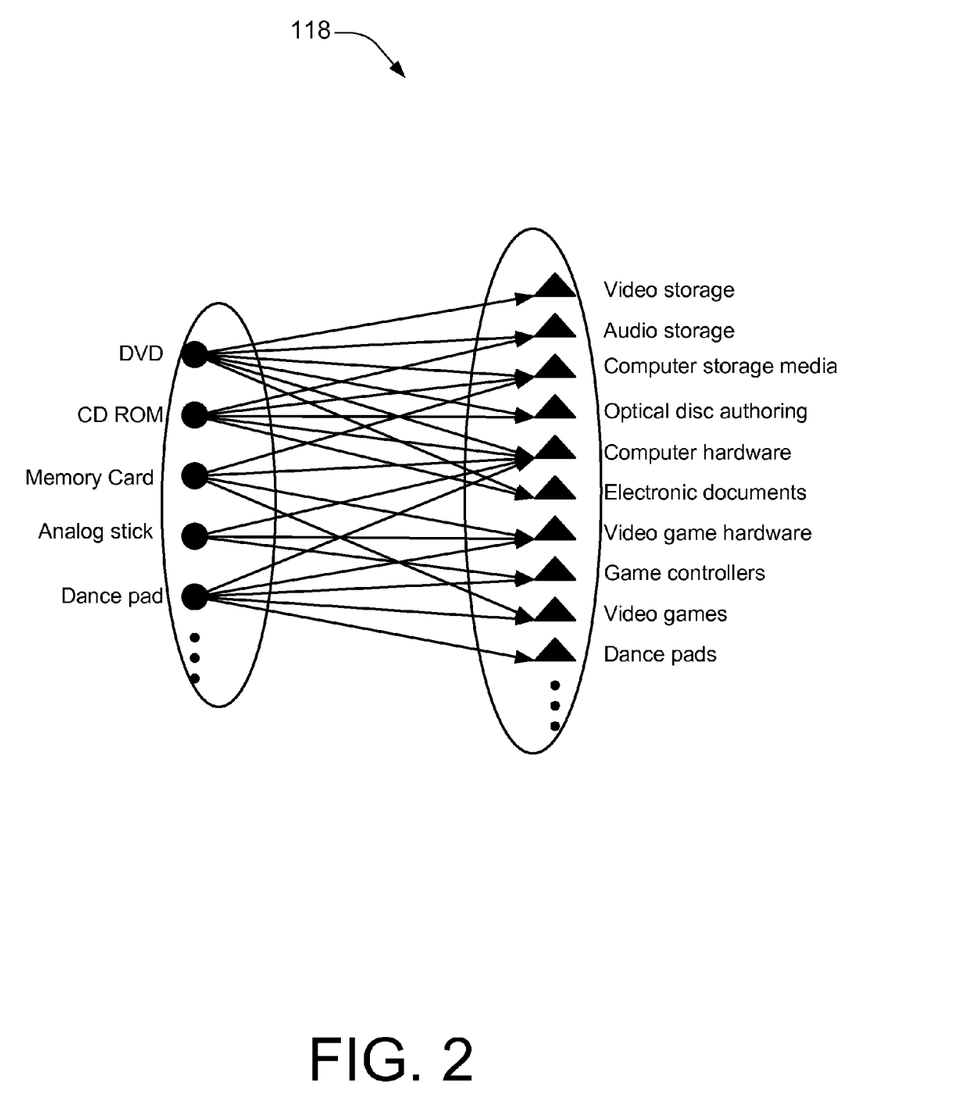
FIG. 2 is a semantic graph that shows relationships between candidate phrases and candidate categories.

The graph has semantic information, since the online encyclopedia taxonomy is applied. FIG. 2 shows an example of the semantic graph 118 which reflects the relations between exemplary candidate phrases and candidate categories.

Selecting Keywords and Categories Based on Semantic Graph Analysis

After the semantic graph 118 is generated, selecting the most representative keywords and topics may be performed. According to the characteristics of a bipartite graph (e.g., semantic graph 118), one approach may be to apply an algorithm, such as Kleinberg's Hyperlink-Induced Topic Search (HITS) algorithm (i.e., HITS-like Ranking 120). In such a HITS algorithm, there are two types of page: an "authority page" and a "hub" page. An "authority" page contains information about the topic, which is similar to a candidate phrase as described. A "hub" page contains a number of links to pages with information about the topic, and is similar to a candidate category. A good hub page points to many good authority pages, and a good authority page is pointed to by many good hub pages. Accordingly, candidate phrases and categories follow the same scheme. Therefore, HITS (i.e., HITS-like Ranking 120) may be used to rank candidate phrases and categories.

However, the weight of each link in HITS may not be considered. In the semantic graph 118, phrases in a web page have different frequencies, while categories have different levels. Therefore, each edge, e=<p, t>E, is given a weight according to the category level as defined by the following equation:

$$w_e = \lambda \cdot f_p, \text{ where } t \in T_p^{(1)} \quad (13)$$

It is defined that $\lambda$ is a parameter between [0,1] and is a decay factor, and $f_p$ is the frequency of the phrase in the web page.

A local iterative process may be applied that "bootstraps" mutually reinforcing relationship to locate important phrases and categories. The term $\alpha_p$ is an authority value of a phrase vector $p \in V_p$, and the term $h_t$ is the hub value of a category vector $t \in V_t$. The vector h is set equal to "1" initially, and following two equations are iteratively executed k times:

$$a_p = \sum_{t \in N(p)} \frac{w_{(p,t)} h_t}{\sum_{d \in N(t)} w_{(q,t)}} \text{ for each } p \in V_p \quad (14)$$

$$h_t = \sum_{p \in N(t)} \frac{w_{(p,t)} a_p}{\sum_{d \in N(p)} w_{(p,d)}} \text{ for each } t \in V_t \quad (15)$$

After k iterations, an output (i.e., Top N Keywords & Categories 122) may be provided of candidate phrases with N the highest authority values as the keywords, and candidate categories of to T hub values as the web page categories.

Extension to Supervised Keyword Extraction

After the steps described are performed, a set of keywords from the web page may be extracted, and giving a ranking score to each of them through mining of an online encyclopedia. However, such a fully unsupervised keyword extraction method may have some drawbacks. In particular, the online encyclopedia may not cover all useful phrases for keyword advertising, although though the online encyclopedia may be one of the largest knowledge bases in the world. Furthermore, some features which may be useful are not considered, such as the HTML structure and the query frequency for each phrase in a web search engine. Therefore, the described unsupervised keyword extraction described above may be combined with traditional features into a supervised machine learning framework, to lead to providing a more accurate classifier.

For example, to expand the candidate phrases in a document for advertising, a statistical phrase extractor as used in traditional models like KEA may be adopted. A phrase with frequency above a threshold r, may be added to the candidate phrase set regardless of whether it can be found among the online encyclopedia concepts.

Given a candidate phrase in a web page, the classifier may predict the probability that a phrase is a keyword. The classifier can output a confidence score for each candidate phrase, and a ranking list for candidates can be generated according to the score.

Various learning algorithms, such as linear support vector machines, logistic regression, decision trees, and naive Bayes may be implemented to train a binary classifier for key phrase extraction. It may be that a logistic regression model is equally good or better than other learning algorithms. Therefore, logistic regression may be used to build a supervised model.

Keyword Features

Particular features may be identified, such as linguistic features, capitalization of words, length of each phrase, and so on. In order to determine the contribution of each feature, removing one type of feature at a time may be performed. For example, the IR feature and Query log features may be the most helpful for the classifier, while the impact of other features was not be as important.

W: Online Encyclopedia Features

In the supervised model, candidate phrases may not be extracted from an online encyclopedia. Therefore, the feature is defined as to whether the phrase can he retrieved from an online encyclopedia. Furthermore, phrases assigned with online encyclopedia concepts may be sorted according to the semantic graph (e.g., semantic graph 118). Therefore, the rank score of each phrase as a feature may be imported.

T: Title

TITLE is a human readable text in the HTML header, which is usually put in the window caption by the browser. The feature may be whether the whole candidate phrase is in the TITLE.

M: Meta Features

In addition to TITLE, several Meta tags arc potentially related to keywords, and are used to derive features. These are: whether the whole candidate phrase is in the meta-description: whether the whole candidate phrase is in the meta-keywords: and whether the whole candidate phrase is in the meta-title.

IR: Information Retrieval Oriented Features

Consideration may be made as to the PF (phrase frequency) and DF (document frequency) values of the candidate as real-valued features. The document frequency measures the general importance of the given term, which is derived by counting how many documents in a web page collection contain the given phrase. In addition to the original PF amid DF frequency numbers, log(PF+1) and log(DF+I) may also be used as features.

Q: Query Log

The query log of a search engine reflects the distribution of the keywords people are most interested in. High frequency queries may be used from the log file to create the following features. In particular, consideration may be made as to one binary feature (i.e., whether the phrase appears in the query log) and two real-valued features (i.e., the frequency with which it appears and the log value, log(1+frequency)).

Logistic Regression

Given the features selected above, a logistic regression model may be trained. Regression is a classic statistical problem which tries to determine the relationship between two random variable, $\overline{X} = \{x_1, x_2, \ldots, x_n\}$ and Y. The independent variable $\overline{X}$ can be the vector of the features described above, and the dependent variable Y may be an output variable to be predicted. For a given phrase, regarded as the vector $\overline{x}$, the model returns the estimated probability $P(Y=1|X=\overline{x})$. The higher the probability calculated based on the regression model, the more relevant a candidate phrase is to the content of the web pages.

The logistic regression model learns a vector of weights, $\overline{w}$, one for each input feature in $\overline{X}$. The actual probability returned is defined by the equation:

$$P(Y = 1 \mid X = \overline{x}) = \frac{e^{\overline{x} \cdot \overline{w}}}{1 + e^{\overline{x} \cdot \overline{w}}} \quad (16)$$

To train a logistic regression model, a set of training data is taken, and a determination is made as to finding the weight vector $\overline{w}$, that makes it as likely as possible. The training instances may include every possible candidate phrase selected from the training documents where Y=1 if they were labeled relevant, and 0 otherwise.

After the classifier predicts the probabilities of candidates being keywords, the described keyword extraction can generate a list of keywords ranked by the probabilities in a descending order.

Constructing an Online Encyclopedia Thesaurus

Online encyclopedias are continually updated with the creation or revision of articles on topical events. For example, the English Wikipedia® encyclopedia edition contained more than 2,000,000 articles on Sep. 9, 2007, with a total of over 615 million words. Each article in the online encyclopedia is associated with a single and unique title. The title is usually a well-formed phrase that resembles a term in a conventional thesaurus. Furthermore, each article must belong to at least one category in the online encyclopedia. Hyperlinks between articles entail many of the same semantic relations as defined in the international standard for thesauri, such as the equivalence relation (i.e., synonymy), the hierarchical relation and the associative relation. However, as an open resource, the online encyclopedia inevitably includes significant noise. Therefore, in order make the online encyclopedia as clean and as easy to use as a thesaurus, the data may be first preprocessed in the online encyclopedia to collect concepts, and then explicitly derive relationships between the concepts based on the rich structural knowledge found in the online encyclopedia.

Online Encyclopedia Concept Filtering

Each title of an online encyclopedia article describes a topic, which may be denoted as a concept. However, some of the titles may be meaningless, and only used for online encyclopedia management and administration, such as "1980s", "List of newspapers", and so on. Therefore, filtering may be performed on the online encyclopedia titles according to the rules described below:

The article belongs to categories related to chronology. i.e. "Years", "Decades" and "Centuries."
The first letter is not capitalized.
The title is a single stop-word.
For a multiword title, not all words other than prepositions, determiners, conjunctions, or negations are capitalized.
The title occurs less than three times in the article.

Synonymy

Each concept may be identified by a "preferred term". The online encyclopedia may guarantee that there is only one article for each concept by using "Redirect Pages" to link equivalent concepts to a preferred one, namely the article's title. A redirect page exists for each alternative name which can be used to refer to an online encyclopedia concept. Synonymy in the online encyclopedia may be from these redirect links. For example, "Michael Jeffrey Jordan" is the full name of the basketball player "Michael Jordan". Therefore, an alternative name for the basketball player, and the article with the title "Michael Jeffrey Jordan" is redirected to the article titled "Michael Jordan". As noted, there are four redirect pages for the concept "library", the plural "libraries", the common misspelling "librari", the technical term "bibliotheca", and a commonly used variant "reading room."

Most online encyclopedia articles mention additional concepts in their content with hyperlinks. Sometimes the hypertext in the hyperlink may be different from the article title of the linked concept. Then this can be used as another source of synonymy.

Polysemy

Another useful structure is "Disambiguation Pages." In an online encyclopedia, disambiguation pages may be solely intended to allow users to choose among several online encyclopedia concepts for an ambiguous term. For example, "jaguar" can be denoted as an animal, a car, a symbol and so on. There may be 23 concepts in the disambiguation page of 'jaguar'. These concepts are organized in four groups: "general", "entertainment", "science and technology", and "sport". Therefore, the content of online encyclopedia articles corresponding to each concept may be used to select the proper sense given an ambiguous word.

Hyponymy

Each online encyclopedia concept may belong to at least one category, and the online encyclopedia can support hyponym relations between categories and form a category ontology. For example, the concept of "Puma" belongs to two categories: "Cat stubs" and "Felines". These categories can be further categorized by associating them with one or more parent categories. The online encyclopedia category "ontology" does not form a simple tree-structured, sub sumption taxonomy, but is a directed acyclic graph in which multiple categorization schemes co-exist simultaneously. To make online encyclopedia categories an "approximate" taxonomy, a large scale taxonomy may be derived.

Exemplary Method(s)

Exemplary methods for implementing extract semantic-based keywords through mining word semantics using the online encyclopedia's taxonomy with reference to FIGS. 1 to 2. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
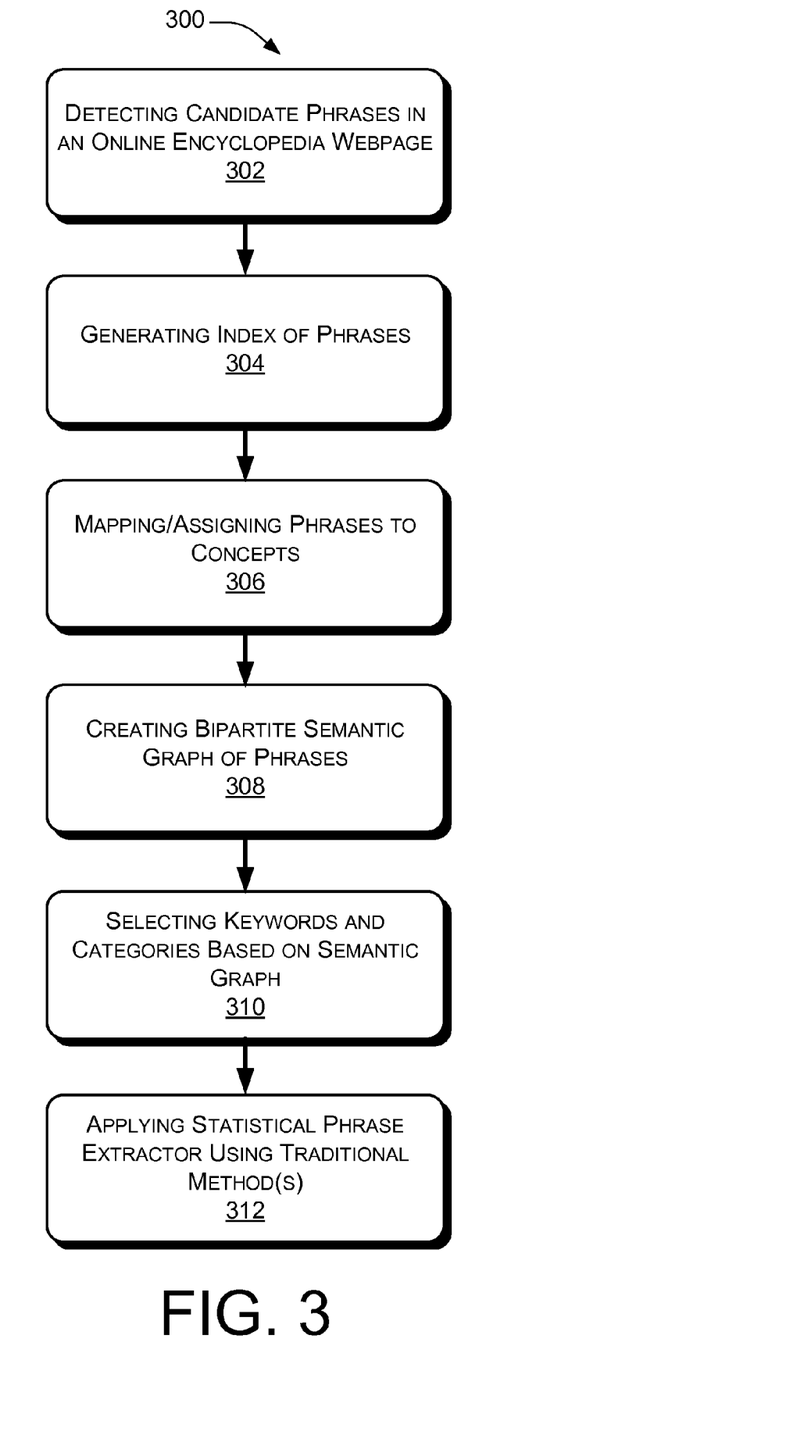
FIG. 3 is a flowchart of a process for performing extraction of semantic-based keywords through mining word semantics using an online encyclopedia taxonomy.

FIG. 3 illustrates an exemplary method 300 implemented for performing extraction of semantic-based keywords through mining word semantics using the online encyclopedia's taxonomy.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 302, detecting candidate phrases in an online encyclopedia webpage is performed. This may include applying a parser to convert the webpage to a DOM tree as described above. Furthermore, as described above a disambiguation process may also be applied.

At block 304, generating an index of the online encyclopedia phrases is performed. Sources to collect online encyclopedia phrases include titles of articles, titles of redirect pages, disambiguation pages, and anchor text of online encyclopedia articles At block 306, assigning phrases to concepts is performed. After the candidate phrases are detected (identified), each phrase is assigned to an online encyclopedia concept. If a phrase is ambiguous, the disambiguation process may be applied.

At block 308, creating a semantic graph of phrases is performed. As discussed above, the semantic graph is a bipartite semantic graph of the phrases that includes semantic information from the online encyclopedia taxonomy.

At block 310, selecting keywords and categories base on the semantic graph is performed. As described above, a HITS algorithm may be implemented to perform this.

At block 312, applying a statistical phrase extractor may be performed. As discussed above, traditional models may be applied to perform this.

An Exemplary Computer Environment

Figure 4:
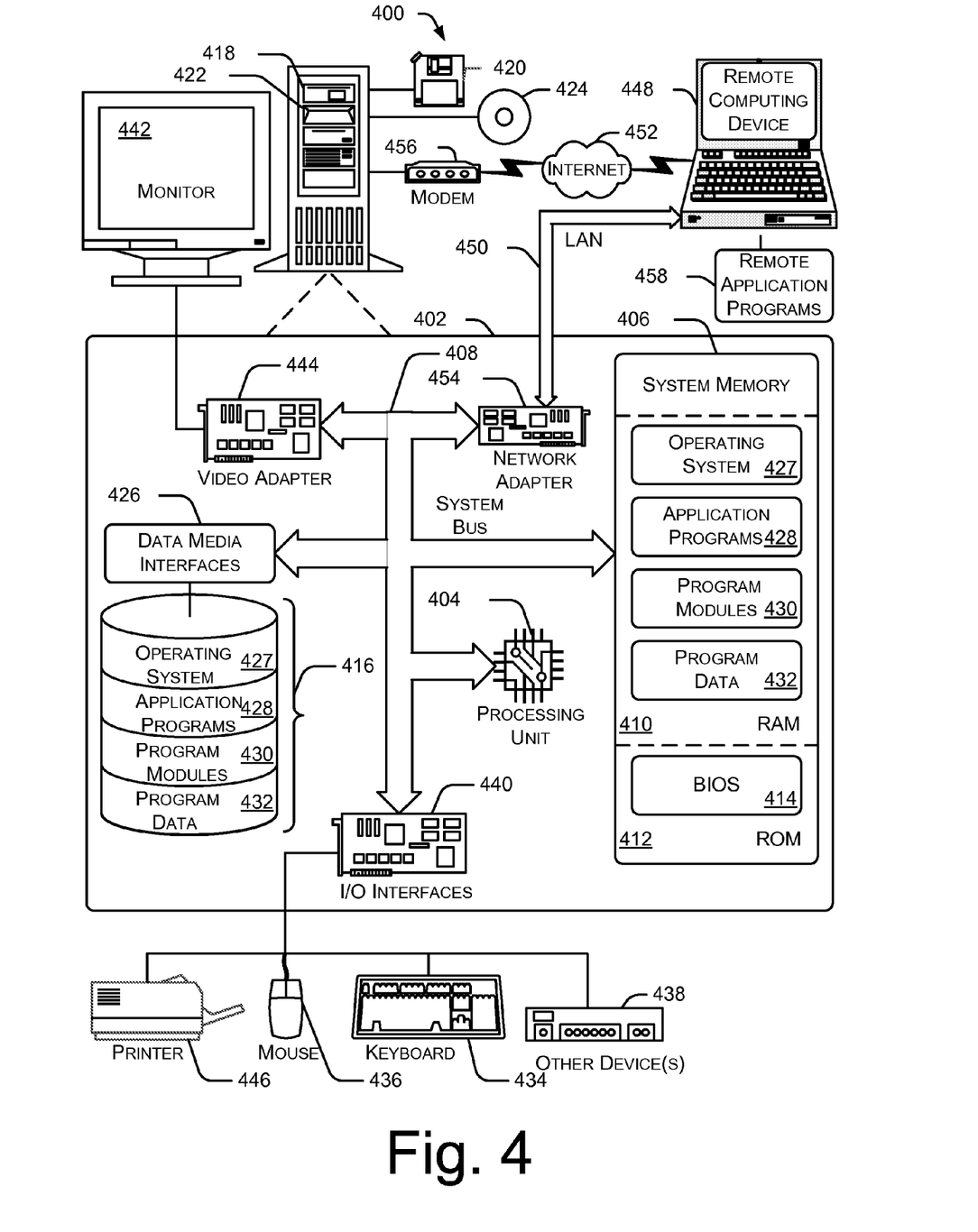
FIG. 4 is a diagram of an exemplary computing system.

FIG. 4 illustrates an exemplary general computer environment 400, which can be used to implement the techniques described herein, and which may be representative, in whole or in part, of elements described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing-based device in the form of a computer 402. Computer 402 can be, for example, a desktop computer, a hand-held computer, a notebook or laptop computer, a server computer, a game console, and so on. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412 is illustrated. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown). Furthermore, FIG. 4 illustrates a magnetic disk drive 418 for reading from and writing to a removable, non-volatile magnetic disk 420 (e.g., a "floppy disk"), additionally FIG. 4 illustrates an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternately, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more applications 428, other program modules 430, and program data 432. Each of such operating system 426, one or more applications 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446, which can be connected to computer 402 via the input/output interfaces 440.

Computer 402 can operate in a networked environment using logical connections to one or more remote computers, such as a remote computing-based device 448. By way of example, the remote computing-based device 448 can be a personal computer, portable computer, a server, a router, a network computer, a peer device or other common network node, and the like. The remote computing-based device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote applications 458 reside on a memory device of remote computer 448. For purposes of illustration, applications and other executable program components such as the operating system are illustrated herein as discrete blocks, although it is recognized that such programs and components reside at various times in different storage components of the computing-based device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for extracting semantic-based keywords through mining word semantics using an online encyclopedia's taxonomy have been described in language specific to structural features and/or methods, it is to be understood that the subject of the appended claims is not necessarily limited to the specific features or methods described. Rather, the specific features and methods are disclosed as exemplary implementations for providing a unified console for management of devices in a computer network.

What is claimed is:

1. A computer-implemented method comprising:
   identifying candidate phrases in a webpage based at least on an online encyclopedia phrases index;
   associating the candidate phrases with online encyclopedia entries; and
   selecting one or more of the candidate phrases as keywords for advertisement targeting based at least in part on quantities of associations between a candidate phrase and categories of the candidate phrases, the categories including the online encyclopedia entries, in which the keywords for advertisement targeting are extracted by mining semantics provided by an online encyclopedia taxonomy.

2. The method of claim 1, wherein the identifying includes applying a parser to convert the webpage to a Document Object Model (DOM) tree, tokenizing contents of the DOM tree into a bag of words, and utilizing the online encyclopedia phrases index to determine whether a word in the bag of words is associated with one or more online encyclopedia entries.

3. The method of claim 1, further comprising generating the online encyclopedia phrases index from one or more of the following: articles, titles of redirect pages, disambiguation pages, and anchor text.

4. The method of claim 1, wherein the associating includes assigning the candidate phrase to a single online encyclopedia entry.

5. The method of claim 4, wherein the assigning includes disambiguating between a plurality of online encyclopedia entries based least in part on one or both of text similarity between the web page and the plurality of online encyclopedia entries or category agreement between category tag(s) of the candidate phrase and categories of the plurality of online encyclopedia entries.

6. The method of claim 1, further comprising constructing a semantic bipartite graph between the candidate phrases and the categories that include the online encyclopedia entries.

7. The method of claim 6, wherein the selecting includes utilizing a Hyperlink-Induced Topic Search (HITS) algorithm on the semantic bipartite graph to select a top N candidate phrases and categories as keywords and topics for the web page.

8. The method of claim 1, further comprising supplementing the keywords by applying a statistical phrase extractor to the web page to implement a supervised keyword search.

9. One or more computer storage media having stored thereon computer-executable instructions that, when executed by a processor, causes the processor to perform operations comprising:
   identifying candidate phrases in a webpage based at least in part on an online encyclopedia phrases index;
   associating the candidate phrases with online encyclopedia entries;
   constructing a semantic bipartite graph between the candidate phrases and categories that include the online encyclopedia entries; and
   selecting one or more of the candidate phrases as keywords for advertisement targeting based at least in part on quantities of associations between a candidate phrase and the categories of the candidate phrases, the associations being derived from the semantic bipartite graph, in which the keywords for advertisement targeting are extracted by mining semantics provided by an online encyclopedia taxonomy.

10. The one or more computer storage media of claim 9, wherein the identifying includes applying a parser to convert the webpage to a Document Object Model (DOM) tree, tokenizing contents of the DOM tree into a bag of words, and utilizing the online encyclopedia phrases index to determine whether a word in the bag of words is associated with one or more online encyclopedia entries.

11. The one or more computer storage media of claim 9, wherein the operations further comprise deriving the categories that include the online encyclopedia entries by collecting hyper-categories of the online encyclopedia entries.

12. The one or more computer storage media of claim 9, wherein the operations further comprise generating the online encyclopedia phrases index from one or more of the following: articles, titles of redirect pages, disambiguation pages, and anchor text.

13. The one or more computer storage media of claim 9, wherein the associating includes assigning the candidate phrase to a single online encyclopedia entry.

14. The one or more computer storage media of claim 13, wherein the assigning includes disambiguating between a plurality of online encyclopedia entries based at least in part on one or both of text similarity between the web page and the plurality of online encyclopedia entries or category agreement between category tag(s) of each candidate phrase and categories of the plurality of online encyclopedia entries.

15. The one or more computer storage media of claim 9, wherein the selecting includes utilizing a Hyperlink-Induced Topic Search (HITS) algorithm on the semantic bipartite graph to select a top N candidate phrases and categories as keywords and topics for the web page.

16. A computing device comprising:
one or more processors;
memory coupled to the one or more processors; and
computer-executable instructions stored on the memory and configured to be operated by the processor to perform operations including:
identifying candidate phrases in a webpage based at least on an online encyclopedia phrases index;
associating the candidate phrases with online encyclopedia entries; and
selecting one or more of the candidate phrases as keywords for advertisement targeting based at least in part on quantities of associations between a candidate phrase and categories of the candidate phrases, the categories including the online encyclopedia entries, in which the keywords for advertisement targeting are extracted by mining semantics provided by an online encyclopedia taxonomy.

17. The computing device of claim 16, wherein the operations further comprise generating the online encyclopedia phrases index from one or more of the following: articles, titles of redirect pages, disambiguation pages, and anchor text.

18. The computing device of claim 16 further comprising constructing a semantic bipartite graph between the candidate phrases and the categories that include the online encyclopedia entries.

19. The computing device of claim 18, wherein the selecting includes utilizing a Hyperlink-Induced Topic Search (HITS) algorithm on the semantic bipartite graph to select a top N candidate phrases and categories as keywords and topics for the web page.

20. The method of claim 1, further comprising deriving the categories that include the online encyclopedia entries by collecting hyper-categories of the online encyclopedia entries.

\* \* \* \* \*